United States Patent [19]

Gripenholt et al.

[11] Patent Number: 4,536,242

[45] Date of Patent: Aug. 20, 1985

[54] METHOD AND APPARATUS FOR RETREADING VEHICLE TIRES

[75] Inventors: Ninneh Gripenholt, Lidköping; Benny Berggren, Vällingby; Göran Böling, Täby, all of Sweden

[73] Assignee: Q & Q Retreading System AB, Lipkoping, Sweden

[21] Appl. No.: 492,734

[22] Filed: May 9, 1983

[30] Foreign Application Priority Data

May 12, 1982 [SE] Sweden ................................ 8202979

[51] Int. Cl.³ ............................................ B29H 17/36
[52] U.S. Cl. ................................... 156/96; 156/130.5; 156/275.5; 156/394.1; 156/909; 425/19; 425/22; 264/25; 264/36
[58] Field of Search ........................ 156/94, 95, 96, 97, 156/909, 110.1, 130.3, 130.5, 73.1, 128.1, 273.3, 273.5, 273.9, 275.5, 275.7, 394.1; 264/25, 27, 36; 425/19, 22, 26

[56] References Cited

U.S. PATENT DOCUMENTS

| | | | |
|---|---|---|---|
| 2,738,406 | 3/1956 | Zaleski | 219/10.55 R |
| 3,689,337 | 9/1972 | Schelkmann | 156/96 |
| 3,783,220 | 1/1974 | Tanizaki | 219/10.55 R |
| 3,867,606 | 2/1975 | Peterson | 219/10.55 R |
| 3,883,382 | 5/1975 | Pelletier | 156/96 |
| 3,894,897 | 7/1975 | Batchelor et al. | 156/96 |
| 3,925,129 | 12/1975 | Blankenship | 156/909 |
| 3,935,045 | 1/1976 | Wolfe | 156/909 |
| 3,938,266 | 2/1976 | Cook | 156/584 |
| 3,989,563 | 11/1976 | Schelkmann | 156/96 |
| 4,098,936 | 7/1978 | Rawls | 156/96 |
| 4,105,482 | 8/1978 | Walpelhorst et al. | 156/909 |
| 4,123,306 | 10/1978 | Landry | 156/96 |
| 4,157,464 | 6/1979 | Smith et al. | 219/10.55 R |
| 4,157,930 | 6/1979 | Björkman et al. | 156/96 |
| 4,208,562 | 6/1980 | Perreault | 219/10.55 R |
| 4,362,917 | 12/1982 | Freedman et al. | 219/10.55 E |

Primary Examiner—Lois E. Boland
Attorney, Agent, or Firm—Silverman, Cass & Singer, Ltd.

[57] ABSTRACT

A method and apparatus for retreading vehicle tires. A carcass is provided with a prevulcanized tread and an unvulcanized tie-gum layer between the carcass and tread. A microwave applicator is located above the tread to emit microwaves against the tire for generating heat energy in the tire whereby the tie-gum layer is vulcanized. Vulcanization of the edges of the tie-gum layer is facilitated by local heating at or in connection with said edges by heat generation outside of the tire. The heating can be effected either by utilizing a material with a high dissipation factor for microwave energy or, alternatively, by use of electric resistance wires.

3 Claims, 8 Drawing Figures

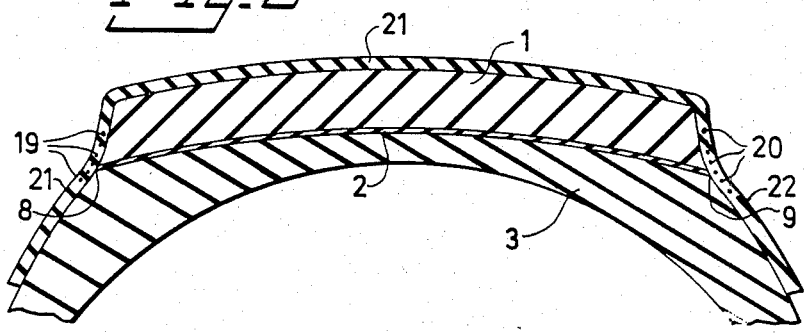
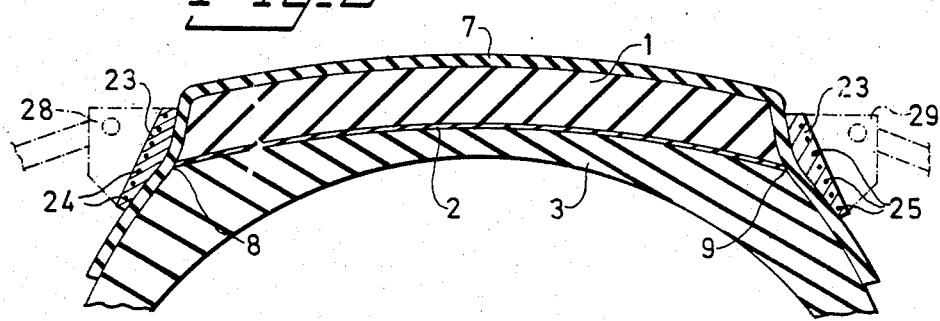
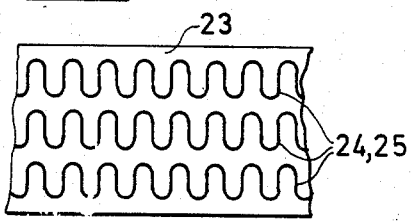
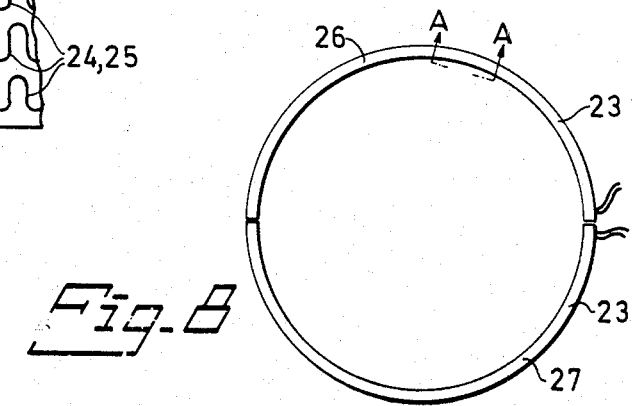

METHOD AND APPARATUS FOR RETREADING VEHICLE TIRES

BACKGROUND OF THE INVENTION

This invention relates to a method and an apparatus for retreading vehicle tires, and especially such method and apparatus in which microwave energy is utilized for heating a tie-gum layer between the carcass and tread of such tires.

Methods and apparatuses for retreading vehicle tires by utilizing microwave energy are described in U.S. Pat. No. 4,157,930 and in co-pending U.S. patent application Ser. No. 06/453,697 in the name of two of the inventors herein and assigned to the same assignee.

When retreading vehicle tires by utilizing microwave energy, a carcass is provided with a prevulcanized new tread and with a tie-gum layer between the carcass and tread. The tie-gum layer is unvulcanized. Above the tread, in an autoclave, a microwave applicator is provided for generating heat by microwaves primarily in the unvulcanized tie-gum layer. The tie-gum layer is vulcanized when its vulcanization temperature has been achieved and maintained for a certain period, whereafter which retreading is completed.

The contact surface of the tread to the tie-gum layer and the contact surface of the tie-gum layer to the carcass are slightly curved, but relatively flat in the plane which is perpendicular to the radius of the tire. The tie-gum layer normally is slightly wider, as seen in the axial direction of the tire, than the tread. The tie-gum, therefore, projects slightly outside the tire side at the point of vulcanization. The reason for this is to ensure a fully satisfactory vulcanization between carcass, tie-gum layer and tread at the edges of the tread.

Prior to the vulcanization, a so-called envelope is positioned upon the tread which also extends a distance down over the tire sides. The purpose for this is to retain the tread in place relative to the carcass during the vulcanization.

In certain cases there exists a problem when the retreading is carried out in the aforesaid manner, viz. that the vulcanization is not completed satisfactorily at the outer portions of the tie-gum. It was found that the problem is due to too strong a cooling of the tire in the autoclave. The autoclave is not heated when microwave energy is utilized for heating the tie-gum layer. In the autoclave a high pressure, for example 7 bar, prevails, resulting in that the cooling capacity of the air at room temperature is substantially higher than at atmospheric pressure.

The problem, thus, is that with utilization of a microwave applicator for heating the tie-gum layer this layer is heated to the degree desired, except at its outer edges, due to the strong cooling of the tire sides.

One method of heating the lateral edges of the carcass is to position a separate microwave applicator at each lateral edge. This method, however, is expensive and causes aging of the carcass and tread, because they also are heated.

The present invention offers a solution of the aforesaid problems.

SUMMARY OF THE INVENTION

The present invention relates to a method and apparatus for retreading of vehicle tires, in which a carcass is provided with a prevulcanized tread and with an unvulcanized tie-gum layer between the carcass and tread, and a microwave applicator is located above the tread to emit microwaves to the tire for generating heat energy in the tire whereby the tie-gum layer is vulcanized. The invention is characterized in that local heating at or in connection with the longitudinal edges of the tie-gum layer is effected by heat generation outside of the tire, thereby facilitating vulcanization of said edges of the tie-gum layer.

BRIEF DESCRIPTION OF THE DRAWINGS

The invention is described in greater detail in the following, with reference to the embodiment shown in the accompanying drawings in which FIG. 5 shows an outer portion of a tire by way of cross-section where a second embodiment of the invention is applied, FIG. 6 is a section corresponding to that shown in FIG. 5 where a variant of said second embodiment is applied, FIG. 7 shows a detail of a resistance strip on an enlarged scale, and FIG. 8 shows a resistance strip on a reduced scale.

DESCRIPTION OF THE PREFERRED EMBODIMENTS

Figure 1:
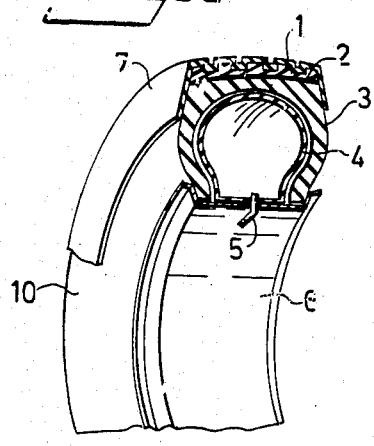
FIG. 1 is a schematic cross-section of a tire in its state at vulcanization.

FIG. 1 is a schematic cross-section of a tire 10 comprising a tread 1, a tie-gum 2, a carcass 3, an inner tube 4 and a valve 5. The tire is mounted on a rim 6.

On a tire to be retreaded, the old tread is ground so that only the carcass 3 remains. Thereafter a tie-gum layer 2 is applied on the outside of the carcass 3, and a completely vulcanized tread 1 is applied above the tie-gum layer 2. Above a tire thus prepared for vulcanization a so-called envelope 7 is threaded, i.e. a casing enclosing the outer portion of the tire 10. The object of said envelope is to retain the tread 1 and tie-gum layer 2 in place relative to the carcass 3 while the tie-gum layer is being vulcanized.

Figure 2:
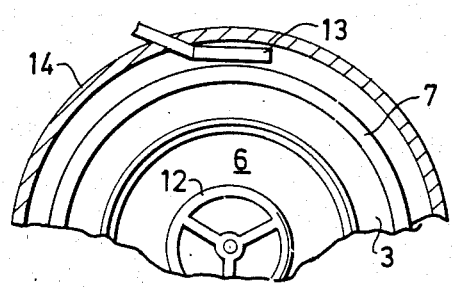
FIG. 2 shows a portion of a tire in a holding device and a portion of a microwave applicator.

When vulcanization is carried out according to said method, the tire 1 is placed in an autoclave 14 of known conventional type, where the rim 6 is attached by a holding member 12 at a driven rotary axle. One or several microwave applicators 13 are arranged in the autoclave 14 in connection with the periphery of an inserted tire. The autoclave 14 is only partially shown in FIG. 2.

The interior of the autoclave 14 is pressurized with air, for example to the pressure 7 bar, and the inner tube of the tire 10 is pressurized with air, for example to the pressure 9 bar. The air both in the autoclave 14 and tire 10 is of room temperature. Thus, neither the interior nor the exterior of the tire is preheated. After the pressurization of the autoclave 4 and tire 10 the tire is rotated by said axle, and microwave energy is fed to the tire by the applicator or applicators.

As described above, heat is developed and uniformly distributed about the tire. As an example, that for a truck tire the time for heating the tie-gum layer 2 to the vulcanization temperature of about 140° C. to 150° C. is about 7 minutes. The vulcanization of the tie-gum layer 2 at this temperature takes about 10 to 12 minutes. The tire is then removed from the autoclave 14, and the envelope 7 is taken off. The tire is then ready for use.

According to the present invention, local heating is effected at or in connection with the edges 8,9 of the tie-gum layer 2 by heat generation in this area. The effect obtained is that only the microwave applicator or applicators 13 must be utilized for vulcanizing the entire tie-gum layer 2.

This local heating can be effected according to two different embodiments of the invention. According to a first embodiment, the local heating is effected by attaching rubber or another material with high dissipation factor in or at said envelope 7. High dissipation factor is understood to refer to a material, the dissipation factor of which from a microwave energy standpoint is higher than normal for an envelope 7 and preferably higher than the dissipation factor for the carcass 3.

Accordingly the microwave applicator 13 available for heating the tie-gum layer 2 is utilized because its emitted energy is converted to heat in a higher degree in the material with a high dissipation factor than in the envelope 7 and preferably carcass 3.

This local heating is adjusted so as to at least compensate of cooling losses from the area for the edges 8,9 of the tie-gum layer 2. Provided that the local heating balances the cooling losses, the tie-gum layer 2 inclusive of its edges 8,9 will be heated by the microwave energy, which penetrates from the microwave applicator 13 down to the tie-gum layer 2 through the tread 1. Different variants of this first embodiment are described below.

Figure 3:
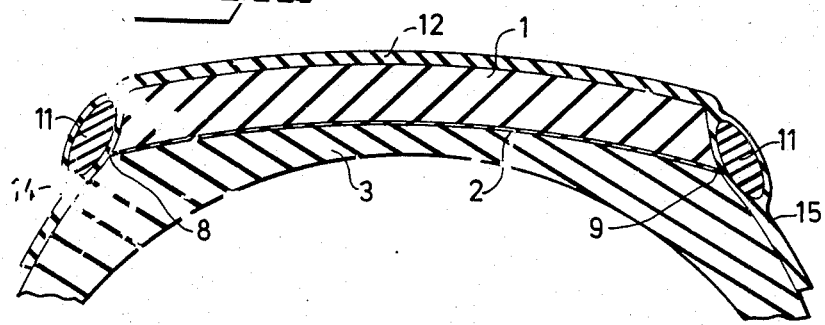
FIGS. 3 and 4 show two different variants according to a first embodiment of the invention where the outer portion of a tire ready for vulcanization is shown by way of cross-section.

According to a first variant shown in FIG. 3, a material 11 with high dissipation factor is provided in the envelope 12 at said area. The material 11, of course, is ring-shaped and extends about the entire envelope in the opposed sides 14,15 thereof.

Figure 4:
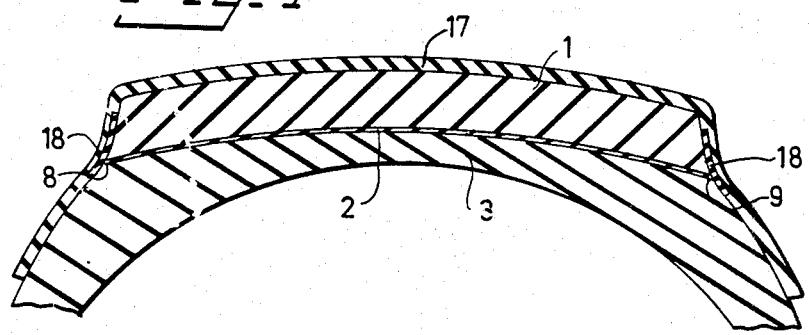

According to a second variant shown in FIG. 4, a material 16 with high dissipation factor is provided between the envelope 17 and the side surfaces of the tire at said area. The envelope 17 can be provided with recesses, in which the material 18 is fitted. The material 18, however, can instead loosely abut the envelope 17 and side surfaces of the tire.

According to a further variant, the opposed side surfaces of the envelope 7, at or in connection to its portions abutting the said edges 8,9 of the tie-gum layer 2, are made of a material with a higher dissipation factor than the envelope in general. This variant is not shown in the attached drawings.

It is, of course, possible to provide further variants without deviating from the scope of the invention.

The aforesaid material 11,18 with a high dissipation factor, for example, may be rubber with high dissipation factor, such as nitrile rubber with high soot content. In principle, every material with high dissipation factor, which is extensible and flexible to the required degree, can be used.

The dimensions of the material can be varied according to demand and tire dimensions, but as an example a thickness of 5 mm to 10 mm and a width of 15 mm to 50 mm can be mentioned.

According to a second embodiment of the invention, the local heating is effected by electric resistance wires.

According with a first variant, electric resistance wires 19,20 are cast in an envelope 21 in connection to its portions abutting the edges 8,9 of the tie-gum layer 2, as shown by way of cross-section in FIG. 5. The resistance wires 19,20 extend about the envelope 21 in the opposed sides 21,22 thereof. The resistance wires 19, 20 preferably are adjusted with desired voltage and amperage so that the effect per side 21,22 is about 1 kW as regards the retreading of truck tires and corresponding ones. The effect, of course, is to be adapted to tire type, tire dimension and the required local heating in view of the emitted microwave effect.

According to a second variant, the local heating is effected by a strip 23 or the like abutting each side of the tire, in which strip resistance wires 24,25 are arranged. Such a strip 23 can be ring-shaped and unbroken or may consist of two parts 26,27, which together form a ring, as shown in FIG. 8. Said lastmentioned embodiment of the strips can in certain connections facilitate its application to the tire sides.

Each strip 23 is retained by holding members 28,29 indicated in FIG. 6 by dashed lines.

In FIG. 6 the strips 23 are shown abutting the outside of the envelope 7. According to one embodiment (not shown), however, the holding members 28,29 together with the strips 23 are designed so that there is no envelope 7, but the strips 23 abut the tire directly.

It is also possible by utilizing a conventional envelope 7 to insert the strips 23 between the envelope and each tire side, whereby the strips 23 are retained by the envelope 7.

A section of a strip 23 of the kind here concerned is shown on an enlarged scale in FIG. 7.

The section in FIG. 7 corresponds to the section A—A in FIG. 8.

The resistance wires 24,25 preferably are laid in a periodically repeating pattern, whereby the strip can be extended without damaging the resistance wires. The strip 23 preferably is made of am extensible rubber material. The width and thickness of the strip can be varied substantially according to demand, but as an example for use for a truck tire a width of 50 mm to 100 mm and a thickness of about 5 mm can be mentioned.

Several embodiments have been described above. It is intended that further embodiments may be provided without deviating from the scope of the invention.

The invention, thus, must not be regarded restricted to the embodiments set forth above, but can be varied within the scope of the attached claims.

We claim:

1. A method of retreading vehicle tires in a pressurized atmosphere at a generally ambient temperature in the absence of a prevulcanization step comprising the steps of, providing an assembly comprising an unvulcanized tie-gum layer between a prevulcanized tire carcass and a prevulcanized tread, locating a microwave applicator above the tread and emitting microwaves to the assembly and thereby to create heat energy in the assembly to cause the tie-gum layer to be vulcanized, and effecting localized heating of the longitudinal edges of the tie-gum layer by attaching material with a high dissipation factor at the outer portions of the assembly adjacent the longitudinal edges of the tie-gum layer to compensate for cooling losses from the edges of the tie-gum layer, which material is retained throughout the vulcanization of the tie-gum layer thereby assuring vulcanization of said tie-gum layer at the edges by compensating for cooling losses at the tie-gum edges and assuring a generally flat vulcanizing temperature gradient from edge to edge of the tie-gum layer.

2. A method as claimed in claim 1 in which said material with a high dissipation factor is attached between each side of the tire and an envelope abutting the outer portions of the tire at the point of vulcanization.

3. A method as claimed in claim 1 including the step of attaching an envelope to outer portions of the tire at the point of vulcanization of said edges.

* * * * *